L. BLOCK.
METHOD FOR PURIFYING WATER.
APPLICATION FILED OCT. 30, 1913.
1,178,901.
Patented Apr. 11, 1916.
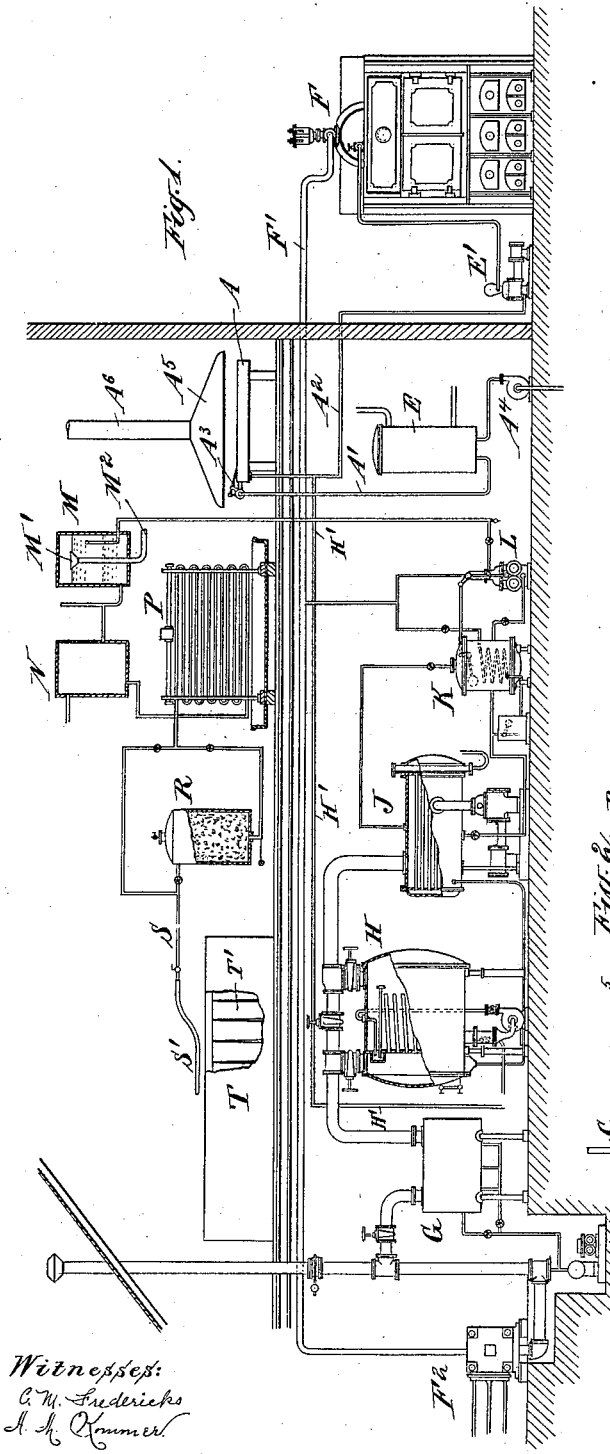
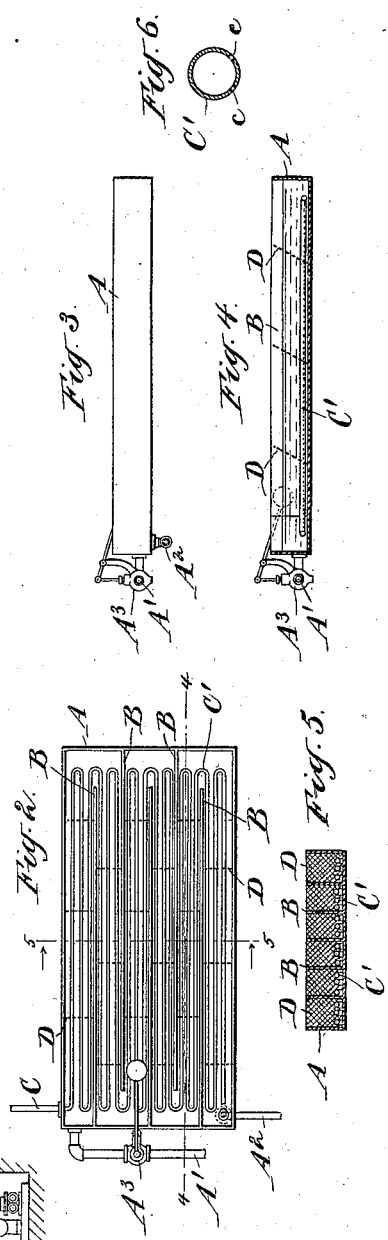
Witnesses:
C. M. Fredericks
A. M. Kummer
Inventor:
Louis Block,
by his attorney,
Charles R. Searle.

UNITED STATES PATENT OFFICE.

LOUIS BLOCK, OF MAMARONECK, NEW YORK.

METHOD FOR PURIFYING WATER.

1,178,901. Specification of Letters Patent. Patented Apr. 11, 1916.

Application filed October 30, 1913. Serial No. 798,159.

*To all whom it may concern:*

Be it known that I, LOUIS BLOCK, a citizen of the United States, residing at Mamaroneck, in the county of Westchester and State of New York, have invented a certain new and useful Improvement in Method for Purifying Water, of which the following is a specification.

The invention relates to the purification of water to be used in making ice, and more particularly in the manufacture of distilled water can ice.

In the usual processes of producing distilled water for ice-making by compression machines, exhaust steam from the steam cylinder of the compressor engine is passed through an oil separator and condensed, the condensate or distilled water thus obtained passes to a re-boiler in which the water is agitated by boiling for the purpose of eliminating air re-absorbed in the condenser and to drive out any objectionable gases originally contained in the water and re-absorbed in the condenser. From the re-boiler the water passes through cooling coils, thence through deodorizers which serve to absorb much of the gases or other substances which give to distilled water its disagreeable odor and taste. From the deodorizer the water is led to the cans and frozen. On splitting the cake of ice thus produced, the center of the core near the bottom of the cake is found to have a very disagreeable odor and taste notwithstanding all the precautions taken, as above outlined, to insure purity.

The condenser may be vented at its highest point to permit the escape of a small quantity of steam with the objectionable gases, and in some instances the exhaust steam is condensed under vacuum and the vacuum pump so connected with the condenser as to remove the air and gases and discharge them into the atmosphere, thus maintaining the vacuum. The latter method is preferable to the former but in both the ice still has the disagreeable odor evidenced by the smell usually perceptible in a cold room or refrigerator in which such ice is used. As a consequence manufacturers of ice-making plants have been driven to adopt the many complicated methods of making raw-water ice in cans, with the objectionable features attending such methods.

The object of the present invention is to provide a purification method by which pure, odorless distilled water can ice may be manufactured.

The accompanying drawings form a part of this specification and show an apparatus employed in carrying out the process in connection with an approved type of ice making plant.

Figure 1 is a general side elevation of such plant, partly in vertical section. Fig. 2 is a plan view of an open vessel used in adapting the improved method to such plant. Fig. 3 is a side elevation of the vessel. Fig. 4 is a longitudinal vertical section of the same, taken on the line 4—4 in Fig. 2. Fig. 5 is a corresponding transverse vertical section taken on the line 5—5 in Fig. 2 and seen in the direction indicated by the arrows. Fig. 6 is a cross-section on a larger scale, showing the pipe of a steam coil used to supply heat to the contents of the vessel.

Similar letters of reference indicate the same parts in all the figures.

In its simplest form the improved method consists in boiling the raw water in an open vessel for a short period, approximately ten minutes has been found sufficient, during which it is agitated by ebullition, removing the scum from the surface, and then flowing it to a boiler in which it is distilled; the condensate is then led to the ice cans without further exposure to the air and frozen. By this means the volatile gases are easily expelled for the reason that raw water has much less affinity for the gases than distilled water, and by treating the water in the raw state they are effectually eliminated.

In the apparatus illustrated in the drawing the method is shown as economically applied to an approved ice-making plant.

A is a shallow vessel or tank having vertical partial partitions B extending alternately from each end of the tank nearly to the opposite end to provide a serpentine channel for the water in its passage through the tank. At the bottom of the latter is a steam coil $C^1$ the pipes of which are preferably perforated on the under face at opposite sides of the center line, as at *c c* in Fig. 6.

D D are screens of woven wire inserted in the channel at intervals between the partitions, and are preferably inclined to the flow therethrough, as shown.

The boiler feed water passes through the feed water heater E and enters the tank A through the supply pipe A¹ and flows along the channel between the partitions B alternately in opposite directions, to the delivery pipe A². During its traverse the water is heated to the boiling point by the coil C¹ receiving steam through the pipe C, and is violently agitated by such boiling. Any scum which may rise is caught by the screens D D which are designed to be readily removed, cleansed, and replaced. The supply pipe A¹ is controlled by a float-valve A³, and the water is supplied to the tank preferably by a centrifugal pump A⁴ which permits the flow through the pipe A¹ to vary without stopping the pump.

A⁵ is a hood above the tank, having a flue A⁶ through which the gases and vapor from the boiling raw water are carried away. Such vapor is found in practice to have the same objectionable odor as the ice produced by the usual processes.

From the tank A the boiled and purified water is led through the delivery pipe A² to the feed water pump E¹ and thence to the boiler F and converted into steam which passes in the pipe F¹ to the cylinder F² of an engine which may be understood to drive the compressor, not shown. The exhaust steam passes through a grease separator G to an evaporator H which also receives water to be evaporated directly from the tank A through a pipe H¹, and serves to produce additional distilled water, as described in the patent to me dated November 20, 1894, No. 529,356, and thence to the condenser J from which the condensate flows to a re-boiler K under the same vacuum as the condenser. The pump L draws the condensate from the re-boiler and delivers it to the skimming tank M in which any remaining oil is removed by the skimmer M¹ and pipe M², and thence the purified water flows to the hot water storage tank N from which it descends to the lowest pipe of the condensed water cooler P and leaves by the uppermost pipe to a deodorizer R comprising a tank containing pea-size triple-burned maple charcoal which absorbs any remaining gas or other substance, and thence is led through the pipe S and hose S¹ to the cams T¹ in the freezing tank T. The resultant ice is found to be entirely free from odor or objectionable taste.

The method will serve with corresponding success in other forms or types of ice making plants; the important step in the process being the preliminary treatment of the raw water by which the free ammonia and the marsh gas contained in nearly all waters is eliminated before its introduction to the steam boiler or other container in which it is distilled. The raw water may be boiled and agitated under a partial vacuum instead of the pressure of the atmosphere as in an open vessel, or such treatment may be given under pressure above that of the atmosphere. The process as described above is preferred.

I claim:

The herein described method of purifying water for the manufacture of odorless distilled water can ice, consisting in gradually eliminating deleterious gases from raw water by slowly moving such water forward, in a state of ebullition and consequent agitation, along an extended channel open to the atmosphere, for the period required to drive out such gases, permitting such gases to escape freely, and distilling the water thus purified in time to prevent re-absorption of deleterious gases.

In testimony that I claim the invention above set forth I affix my signature, in presence of two witnesses.

LOUIS BLOCK.

Witnesses:
CHARLES R. SEARLE,
CORA M. FREDERICKS.

Copies of this patent may be obtained for five cents each, by addressing the "Commissioner of Patents, Washington, D. C."